United States Patent [19]

Komurasaki

[11] Patent Number: 4,944,179
[45] Date of Patent: Jul. 31, 1990

[54] VIBRATION DETECTOR

[75] Inventor: Satosi Komurasaki, Hyogo, Japan

[73] Assignee: Mitsubishi Denki Kabushiki Kaisha, Tokyo, Japan

[21] Appl. No.: 465,657

[22] Filed: Jan. 22, 1990

Related U.S. Application Data

[63] Continuation of Ser. No. 252,407, Oct. 3, 1988, abandoned.

[30] Foreign Application Priority Data

Oct. 1, 1987 [JP] Japan .................... 62-150588[U]

[51] Int. Cl.$^5$ .............................. G01P 15/09
[52] U.S. Cl. .......................... 73/35; 73/654; 310/329
[58] Field of Search ............. 73/35, 652, 654, DIG. 1, 73/DIG. 4; 310/329, 338

[56] References Cited

U.S. PATENT DOCUMENTS 4,225,302 9/1980 Suzuki et al. ................. 310/321
4,399,705 8/1983 Weiger et al. ................. 73/35

FOREIGN PATENT DOCUMENTS 184666 6/1986 European Pat. Off. ......... 73/35
3025808 2/1982 Fed. Rep. of Germany .

OTHER PUBLICATIONS

*Hutte des Ingenieurs Taschenbuch,* pp. 50-51, Berlin, Wilhelm Ernst and Sohn, 1954.

Primary Examiner—John Chapman
Attorney, Agent, or Firm—Sughrue, Mion, Zinn, Macpeak and Seas

[57] ABSTRACT

The vibration detector comprises a tube-like portion provided with a threaded bolt hole and a threaded portion defined on the outer periphery of the top of the tube-like portion and is secured integrally to the object the vibration of which is to be detected by means of a bolt inserted in the threaded bolt hole and a nut engaged with the bolt. The outer diameter of the portion of the tube-like portion apart from the threaded portion is equal to or smaller than the minimum diameter of the threaded portion. Thus the compression stress caused by the bolt inserted in the threaded bolt hole against clamping force can be fully secured because the strength of the tube-like portion depends on the minimum diameter of the threaded portion.

9 Claims, 3 Drawing Sheets

VIBRATION DETECTOR

This is a continuation of application Ser. No. 07/252,407 filed Oct. 3, 1988, abandoned.

BACKGROUND OF THE INVENTION

1. Field of the Invention

This invention relates to a vibration detector used for such purposes as to detect the vibration of an internal-combustion engine and knocking of the same.

2. Description of the Prior Art

FIGS. 1 to 3 show a conventional vibration detector A. In these drawins, reference number 1 is a bushing made from a ferrous metallic material including a bolt threading hole 13 at its center portion. The bushing comprises a bearing surface 1a for connecting the detector A to an internal-combustion engine B, a block surfare 1b for attaching a vibration detecting part, a tube-like portion 1c which is a shaft for mounting the vibration detecting part, and a threaded portion 1d at the top portion of the tube-like portion 1c. Reference number 2 designates a retaining shield connected to the outer periphery of the bushing 1 by adhesion and defining a part receiving space C between the bushing 1 and itself. Reference number 3 is a connector provided integrally with the retaining shield 2 which includes an output terminal 11 for emitting detecting signals. Reference number 4 is a plate located on the block surface 1b of the bushing 1 and 5 is a piezoelectric element for converting vibrations into electric signals, the reference electrode of which is connected to the plate 4. Reference number 6 denotes a terminal in contact with an output electrode of the piezoelectric element 5 and adapted to output detecting signals, and 7 designates an isolating sheet made from a film such as PET (polyethylene terephthalate) or PPS (polyphenylene sulfide) which is located in contact with the side of the terminal 6 with which the piezoelectric element 5 has no contact. Reference number 8 is a weight which applies vibrational energy to the piezoelectric element 5; 9 a nut screwed to the tube-like portion 1c for the purpose of fixing the plate 4, the piezoelectric element 5, the terminal 6, the isolating sheet 7 and the weight 8 to the tube-like portion 1c; 10 an epoxy filler for sealing the receiving portion between the bushing 1 and retaining shield 2; and 12 an isolating tube formed from an adhesive tape or a heat shrinkable tube provided between the bush and the piezoelectric element 5, the terminal 6 and the isolating sheet 7. The detecting signal supplied by the piezoelectric element 5 is emitted by the terminal 6. Because the terminal 6 and the output terminal 11 are connected to each other, the detecting signal is output to the outside of the detector A through the connector 3.

The vibration detecting principle of the above-mentioned vibration detector A will now be described. As shown in FIG. 3, the vibration detector A is secured with its bearing surface 1a in contact with the internal-combustion engine B by means of a stud bolt D inserted through the hole 13 of the bushing 1 and a nut E which engages with the bolt D. The vibrations produced in accordance with the condition in which the internal-combustion engine B is driven are transmitted to the detector A from the bearilng surface 1a. Because the weight 8 overlaps the piezoelectric element 5, the inertial force of the weight 8 is communicated to the piezoelectric element 5 is accordance with the level of vibration. When the piezoelectric element 5 receives the inertial force, it generates a detecting signal representing that force and outputs the detecting signal to the electrode on the side of the terminal 6 on the basis of the reference electrode on the plate 4 side. Since the plate 4 is made from a metallic material, the reference electrode of the piezoelectric element 5 is equipotential with the bushing 1. On the other hand, since the nut 9 and the weight 8 are also metallic, the weight 8 is equipotential with respect to the reference electrode of the piezoelectric element 5. For this reason, the terminal 6 and the weight 8 are isolated by virtue of the presence of the isolating sheet 7, so the detecting signal supplied by the piezoelectric element 5 is emitted at the terminal 6 to be output via the output terminal 11. Because the isolating tube 12 is fitted on the tube-like portion 1c of the bush 1, the terminal is not short-circuited to the tube-like portion 1c of the bush 1 even if the terminal is eccentrically mounted on the tube-like portion. In this way, the isolating tube 12 can be seen as being important to emit the detecting signal securely. The interior which is surrounded by the block surface 1b, the plate 4, the piezoelectric element 5, the terminal 6, the isolating sheet 7, the weight 8 and the nut 9 on the periphery of the the tube-like portion 1c which is provided with the isolating tube 12 is not filled with the filler 10.

As clearly shown in FIG. 2, the diameter $\phi_2$ of the portion of the tube-like portion 1c of the bush 1 apart from the threaded portion 1d is arranged to be equal to or larger than the major diameter of the threaded portion 1d. This arrangement is made for the following reason. That is, the portion of the tube-like portion 1c apart from the threaded portion 1d is manufactured in the same way over the full length thereof for manufacturing simplicity, and as it is necessary to perform a basic process on the tube-like portion 1c to form the threaded portion 1d, the diameter of the portion of the tube-like portion 1c apart from the threaded portion 1d is made equal to or larger than that of the threaded portion 1d.

Because the conventional vibration detector is formed in this way, in a case where the portion of the tube-like portion 1c of the bush 1 apart from the threaded portion 1d has to be lengthened, the overall weight of the bushing 1 is increased. It is then impossible to reduce the size and weight of either the bush 1 or the vibration detector as a whole.

Further, as shown in FIG. 3, in a case where the vibration detector A is attached to the internal-combustion engine B by means of the bolt D and nut E, the tube-like portion 1c of the bushing 1 is subjected to the compression force of the nut E and the tube-like portion 1c is therefore designed on the basis of the magnitude of the compression stress produced in the bush 1. As the strength of the tube-like portion 1c depends on the portion having the smallest diameter, the stength of the tube-like portion 1c against compression depends on the minimum diameter of the threaded portion 1d. Accordingly, even if the diameter of the portion of the tube-like portion 1c apart from the threaded portion 1d is enlarged, this only leads to an increase in the weight of the bushing 1 and the strength of the tube-like portion 1c against compression is not necessarily raised.

SUMMARY OF THE INVENTION

One object of the present inventin is to provide a vibration detector of minimal weight.

More particularly, one object of the present invention is to provide a vibration detector including a tube-like portion provided with a threaded bolt hole and attached to an object the vibration of which is to be detected by means of a bolt inserted into the threaded bolt hole and a nut which engages with the bolt, wherein the required strength of the tube-like portion is secured and the weight of the tube-like portion is reduced.

Another object of the invention is to provide a vibration detector which connects the vibration of the object concerned into an electric signal by way of a piezoelectric element and outputs this electric signal.

Yet, another object of the invention is to provide a vibration detector including a bush provided with a tube-like portion and a vibration detecting part secured to the bushing, wherein the above-mentioned vibration detecing part is electrically isolated from the bush by an isolating tube fitted on the bush.

Still another object of the invention is to provide a vibration detector suitable for detection of unusual levels of vibration of an internal-combustion engine.

For the purpose of attaining such objects, the vibration detector of the present invention is characterized in that the diameter of the portion of the tube-like portion apart from the threaded portion is arranged to be equal to or smaller than the minimum diameter of the threaded portion.

As mentioned above, because the strength of the tube-like portion depends on the minimum diameter of the threaded portion, the strength of the tube-like portion does not decrease even if the diameter of the portion thereof apart from the threaded portion is smaller than the minimum diameter of the threaded portion. It is also possible to reduce the weight of the tube-like portion since its diameter is smaller than the minimum diameter of the threaded portion.

Other objects, constructions and effects of the present invention will be clarified hereinafter by the following description of preferred embodiments with reference to the drawings.

DETAILED DESCRIPTION OF THE INVENTION

Figure 1:
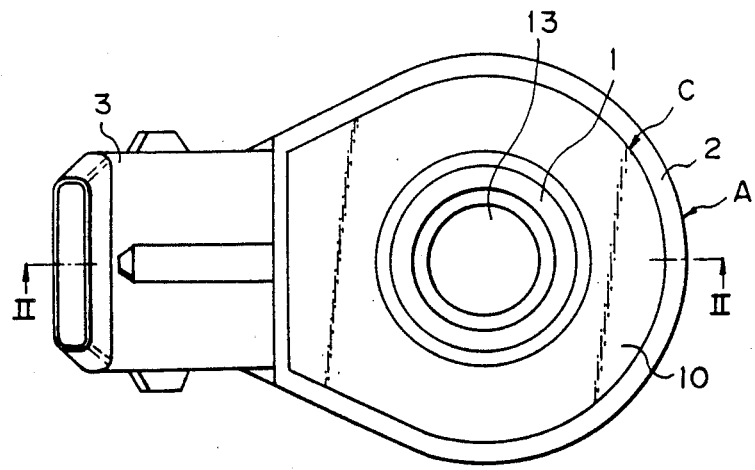
FIG. 1 is a plan view of a conventional vibration detector.
Figure 3:
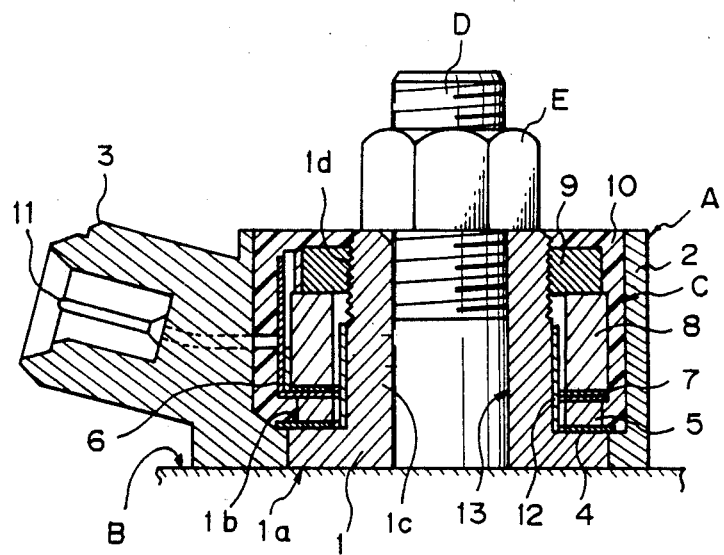
FIG. 3 is a cross-sectional view showing a state where the conventional vibration detector illustrated in FIGS. 2 and 3 is secured to an internal-combustion engine.
Figure 4:
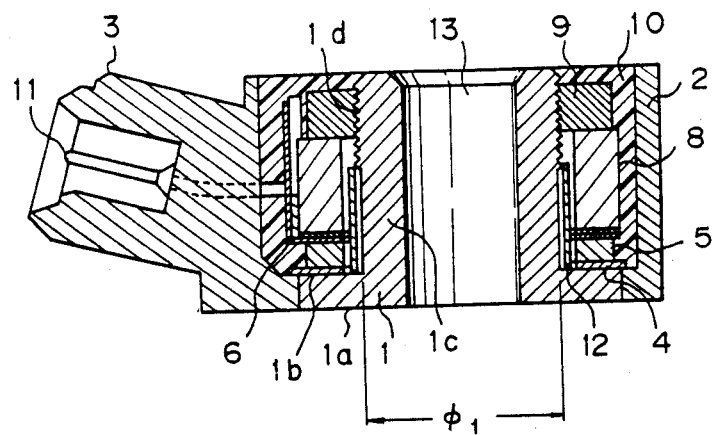
FIG. 4 is a cross-sectinal view of one embodiment of a vibration detector of the invention.

FIG. 4 is a cross-sectional view of one embodiment of a vibration detector according to the present invention. In FIG. 4, all the reference numerals are identical to those used in FIGS. 1 and 3 showing a conventional vibration detector. The present invention differs from the prior art in that the diameter of the portion of the tube-like portion 1c apart from the threaded portion 1d is equal kto the minimum diameter $\phi$, of the threaded portion 1d. That is to say, because the threaded portion 1d of the tube-like portion 1c is formed to be smallest within the design parameters related to the clamping stress caused by the bolt used to attach the vibration detector to the internal-combustion engine, the tube-like portion 1c is assumed of having sufficient strength to withstand the clamping stress of the bolt.

The respective inner diameters of such compositional parts as the plate 4, the piezoelectric element 5, the terminal 6, the isolating sheet 7 and the weight 8 are required to be more than the maximum diameter of the threaded portion 1d of the tube-like portion 1c. The surface of the block surface 1b is finished from the inner periphery thereof, positioned inside of the inner peripheries of the above-mentioned compositional parts, and it is necessary to finish the surface from this inner periphery so that the compositional parts can be attached to the prescribed finished surface even if attached eccentrically. Thus, if the diameter of the tube-like portion 1c apart from the threaded portion 1d is set to be equal to the minimum diameter $\phi_1$ of the threaded portion 1d, the desired surface finishing can be done from the inner periphery of the block surface 1b positioned inside the inner periphery of the threaded portion 1d, and even if the compositional parts are mounted eccentrically, they can be positioned on the block surface 1b. In particular, the piezoelectric element 5 needs the surface of the block surface 1b to be accurate, and this precision is important in the case of designing a vibration detector because a chipping or cracking will be causing if the precision is inadequate. In addition, if the tube-like portion 1c is formed in such a manner that its overall diameter is equal to the maximum diameter of the threaded portion 1d like the conventional embodiment in FIGS. 1 to 3, the corner where the tube-like portion 1c and the block surface 1b meat has to be cut slightly. This results in a restricted ability to process the block surface 1b with allowance for the eccentricity of the compositional parts, and it is clear that the scope in this respect is more limited than the case shown in FIG. 1.

Figure 5:
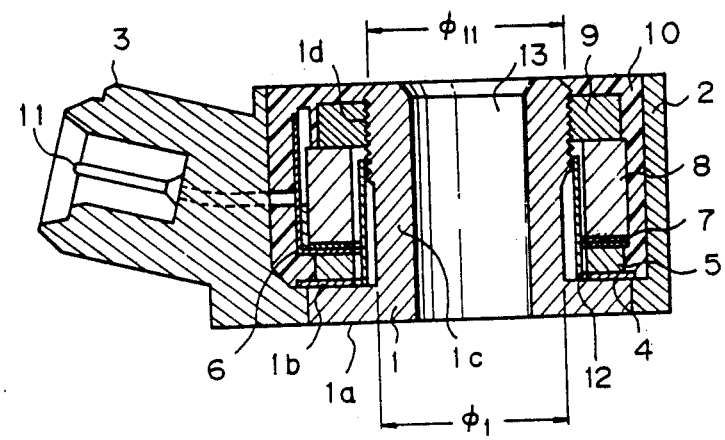
FIG. 5 is a cross-sectional view of another embodiment of a vibration detector of the invention.

In order to stabilize the detecting characteristics of a vibration detector (for example, to flatten the detection frequency characteristics), it is desirable to increase the clamping force of the nut and the pressurizing applied to the piezoelectric element. For this reason, it is preferable that the thread diameter of the nut is made large and it is thus necessary to enlarge the thread diameter of the threaded portion of the tube-like portion 1c. In the above-mentioned case, the thread diameter of the tube-like portion 1c is larger than that of the portion apart from the threaded portion. An explanation of this aspect will be given with reference to FIG. 5. The tube-like portion 1c is formed in such a manner that the threaded portion 1d has a minimum diameter of $\phi_{11}$ (larger than $\phi_1$) and the portion apart from the threaded portion 1d has a diameter of $\phi_1$. In this case, because the strength of the tube-like portion 1c depends on the diameter $\phi_1$ of the portion apart from the threaded portion ($\phi_1 < \phi_{11}$), a compression stress equal to that shown in FIG. 1 is secured and the diameter $\phi_1$ of the tube-like portion 1c is the minimum value within the design parameters applicable to FIG. 1, allowing the weight of the vibration detector to be reduced.

Figure 2:
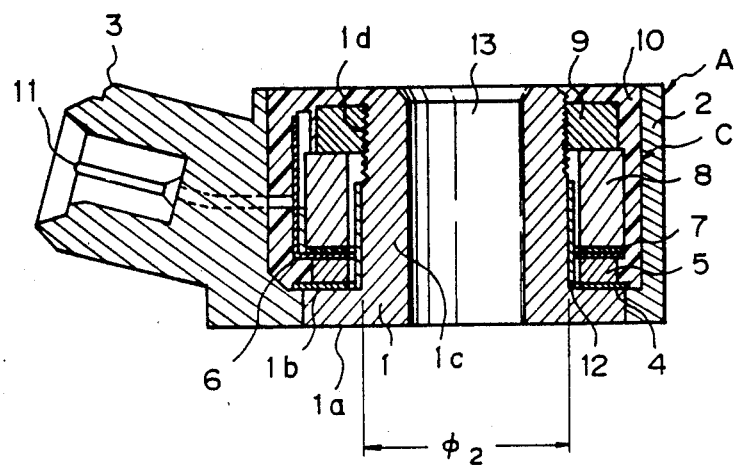
FIG. 2 is a cross-sectional view as viewed along the line II—II in FIG. 1.

On the other hand, when the diameter $\phi_1$ of the tube-like portion 1c is set to be smaller than $\phi_{11}$, it is preferable that the isolating tube 12 is positioned at the portion extending from block surface 1b to the threaded portion 1d. In a case where the isolating tube 12 is formed cylindrically from a film material such as PET (polyethylene terephthalate) or PPS (polyphenylene sulfide), the isolating tube is fitted so as to be located at a position away from the threaded portion 1d of the tube-like portion 1c with its inner diameter being greater than the maximum diameter of the threaded portion 1d. In this case, since the inner diameter of the isolating tube 12 is greater than the diameter $\phi_1$ of the portion of the tube-like portion 1c apart from the threaded portion and it is therefore unstable in the radial direction, the isolating tube 12 is provided with one part thereof overlapping the threaded portion 1d as shown in FIG. 2. Thus both isolation of the portion having the diameter $\phi_1$ and alignment of the compositional parts during assembly can be achieved easily and securely.

As mentioned above, according to the present invention, because the outer diameter of the portion of the tube-like portion apart from the threaded portion in the vibration detector is equal to or smaller than the minimum diameter of the threaded portion, the compression stress caused by the bolt of the bush against the clamping force can be fully assured and a reduction in weight can be achieved.

What is claimed is:

1. A vibration detector for detecting the vibration of an object, comprising:
    a bushing having a bolt hole extending therethrough, said bushing having a block portion for attaching said detector to said object by means of a bolt extending from said object through said bolt hole and a tube-like portion extending from said block portion, said tube-like portion having a threaded portion and a non-threaded portion, said non-threaded portion being between said threaded portion and said block portion, the outer diameter of said non-threaded portion being equal to or smaller than the minimum diameter of said threaded portion;
    a piezoelectric element for converting vibration of said object into an electric signal;
    a weight adapted to subject said piezoelectric element to a load; and
    a nut engaged with said threaded portion of said tube-like portion, said piezoelectric element and said weight being secured by means of said nut.

2. A vibration detector as claimed in claim 1, wherein said piezoelectric element is located on a plate while a reference electrode of said piezoelectric element is connected to said plate, a terminal is located on the upper face of said piezoelectric element while said terminal is connected to an output terminal of said piezoelectric element, said weight is located on said terminal via an isolating sheet, and said terminal is connected to an output terminal of a connector.

3. A vibration detector as claimed in claim 2, wherein an isolating tube is fitted at the portion of said tube-like portion apart from said threaded portion on the outer periphery thereof and said plate, piezoelectric element, terminal, isolating sheet and weight are isolated electrically from said tube-like portion by said isolating tube.

4. A vibration detector comprising: a bushing having a tube-like portion provided with a through hole for attaching said detector to said object by means of a bolt extending from said object through said hole, said tube-like portion having a threaded portion on the outer periphery of the top portion of said tube-like portion and a non-threaded portion provided on the bottom portion thereof, said non-threaded portion being disposed between said object and said threaded portion; a retaining shield attached to said bushing and defining a part receiving space around said tube-like portion; a vibration detecting part received in said part receiving space for converting the vibration of an object the vibration of which is to be detected into an electric signal for output; a nut engaged with said threaded portion of said tube-like portion for securing said vibration detecting part to said bushing; and a filler charged in said part receiving space for sealing said vibration detecting part, wherein the outer diameter of said non-threaded portion of said tube-like portion is equal to or smaller than the minimum diameter of said threaded portion.

5. A vibration detector as claimed in claim 4, wherein a block surface extending radially from the outer periphery of said tube-like portion is provided at the end opposite to said threaded portion of said tube-like portion, said vibration detecting part is mounted on said block surface, and said vibration detecting part is secured to said block surface by means of said nut.

6. A vibration detector as claimed in claim 5, wherein an isolating tube for isolating said tube-like portion electrically from said vibration detector is fitted on said tube-like portion, and one end of said isolating tube is engaged with said threaded portion while the other end of said isolating tube is mounted on said block surface.

7. A vibration detector as claimed in claim 5, wherein said vibration detecting part is constructed from a plate mounted on said block surface, a piezoelectric element located on said plate and whose reference electrode is connected to said plate, a terminal mounted on the upper surface of said piezoelectric element and connected to an output terminal of said piezoelectric element, an isolating sheet located on said terminal and a weight mounted on said isolating sheet.

8. A vibration detector as claimed in claim 4, wherein said object the vibration of which is to be detected is an internal-combustion engine.

9. A vibration detector as claimed in claim 7, wherein a connector having an output terminal is formed integrally with said retaining shield, and said output terminal is connected to said terminal.

* * * * *